United States Patent
Lee et al.

(10) Patent No.: US 10,521,058 B2
(45) Date of Patent: Dec. 31, 2019

(54) TOUCH PANEL INCLUDING CONNECTION ELECTRODES FORMED DIFFERENTLY IN FIRST AREA THAN SECOND AREA AND DISPLAY APPARATUS INCLUDING THE SAME

(71) Applicant: Samsung Display Co., Ltd., Yongin-si (KR)

(72) Inventors: Innam Lee, Yongin-si (KR); Choonhyop Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 588 days.

(21) Appl. No.: 15/207,515

(22) Filed: Jul. 12, 2016

(65) Prior Publication Data

US 2017/0153726 A1 Jun. 1, 2017

(30) Foreign Application Priority Data

Nov. 30, 2015 (KR) .......................... 10-2015-0168988

(51) Int. Cl.
*G06F 3/044* (2006.01)

(52) U.S. Cl.
CPC .................................... *G06F 3/044* (2013.01)

(58) Field of Classification Search
CPC ....................................................... G06F 3/044
See application file for complete search history.

(56) References Cited

U.S. PATENT DOCUMENTS

| 2007/0085963 | A1* | 4/2007 | Huang | G02F 1/1345 |
| | | | | 349/152 |
| 2010/0214233 | A1 | 8/2010 | Lee | |
| 2012/0098762 | A1* | 4/2012 | Kim | G06F 3/044 |
| | | | | 345/173 |
| 2013/0021289 | A1* | 1/2013 | Chen | G06F 1/1601 |
| | | | | 345/174 |

(Continued)

FOREIGN PATENT DOCUMENTS

| KR | 10-2009-0000921 | 1/2009 |
| KR | 10-2014-0021948 | 2/2014 |

(Continued)

*Primary Examiner* — William Boddie
*Assistant Examiner* — Andrew B Schnirel
(74) *Attorney, Agent, or Firm* — H.C. Park & Associates, PLC

(57) ABSTRACT

A touch panel includes a substrate, detection electrodes, and connection electrodes. The substrate includes a planar surface portion and a curved surface portion adjacent to the planar surface portion in a first direction, the curved surface portion including an active region and another region disposed outside the active region. The detection electrodes are disposed on the substrate. The detection electrodes are arranged in the first direction and a second direction crossing the first direction. The connection electrodes electrically connect adjacent detection electrodes arranged in a same direction as one another. A connection electrode of the connection electrodes connecting detection electrodes adjacent to each other of the detection electrodes arranged in the first direction is disposed in the active region of the curved surface portion. The connection electrode includes a portion extending in a different direction than the first direction.

20 Claims, 11 Drawing Sheets

(56) References Cited

U.S. PATENT DOCUMENTS

| | | | |
|---|---|---|---|
| 2013/0300678 A1* | 11/2013 | Kang | G06F 3/044 |
| | | | 345/173 |
| 2013/0328830 A1 | 12/2013 | Han et al. | |
| 2014/0022202 A1* | 1/2014 | Badaye | G06F 3/044 |
| | | | 345/174 |
| 2014/0071065 A1* | 3/2014 | Kung | G06F 3/041 |
| | | | 345/173 |
| 2015/0070312 A1* | 3/2015 | Her | G06F 3/041 |
| | | | 345/174 |
| 2015/0177878 A1 | 6/2015 | Cheng et al. | |
| 2015/0277627 A1* | 10/2015 | Pang | G06F 3/044 |
| | | | 345/174 |
| 2016/0170523 A1* | 6/2016 | Park | G06F 3/044 |
| | | | 345/174 |

FOREIGN PATENT DOCUMENTS

| | | |
|---|---|---|
| KR | 10-1385438 | 4/2014 |
| KR | 10-1501901 | 3/2015 |

\* cited by examiner

TOUCH PANEL INCLUDING CONNECTION ELECTRODES FORMED DIFFERENTLY IN FIRST AREA THAN SECOND AREA AND DISPLAY APPARATUS INCLUDING THE SAME

CROSS-REFERENCE TO RELATED APPLICATION

This application claims priority from and the benefit of Korean Patent Application No. 10-2015-0168988, filed on Nov. 30, 2015, which is hereby incorporated by reference for all purposes as if fully set forth herein.

BACKGROUND

Field

Exemplary embodiments relate to a touch panel and a display apparatus including the same, and, more particularly, to a touch panel configured to prevent (or reduce) defects in curved surface portions and a display apparatus including the same.

Discussion of the Background

Electronic devices, such as smart phones, digital cameras, laptop computers, navigation units, smart televisions, and the like, that provide images to users, typically include a display apparatus for displaying images. The display apparatus may include a touch function to provide users with a convenient method of interaction. The display apparatus including the touch function may include a display panel and a touch panel disposed on the display panel. The display panel responds to an input signal from the touch panel to display an image corresponding to the input signal. It is also recognized that display apparatuses may be formed in various shapes. For example, a display apparatus may include a curved display panel transformed into a shape of a curved surface by applying a determined force to a flat display panel or configured as a flexible display panel, which may be folded, rolled, flexed, etc. In this manner, the touch panel may also have the same shape as the display panel, and may be disposed on (or incorporated as part of) the display panel. Generally, when the touch panel is transformed from a flat plate shape into a curved surface shape, defects in wiring portions may occur in a curved surface portion.

The above information disclosed in this Background section is only for enhancement of understanding of the background of the inventive concept, and, therefore, it may contain information that does not form the prior art that is already known to a person of ordinary skill in the art.

SUMMARY

One or more exemplary embodiments provide a touch panel configured to prevent (or at least reduce) defects in curved surface portions and a display apparatus including the same.

Additional aspects will be set forth in the detailed description which follows, and, in part, will be apparent from the disclosure, or may be learned by practice of the inventive concept.

According to one or more exemplary embodiments, a touch panel includes a substrate, detection electrodes, and connection electrodes. The substrate includes a planar surface portion and a curved surface portion adjacent to the planar surface portion in a first direction, the curved surface portion including an active region and another region disposed outside the active region. The detection electrodes are disposed on the substrate. The detection electrodes are arranged in the first direction and a second direction crossing the first direction. The connection electrodes electrically connect adjacent detection electrodes arranged in a same direction as one another. A connection electrode of the connection electrodes connecting detection electrodes adjacent to each other of the detection electrodes arranged in the first direction is disposed in the active region of the curved surface portion. The connection electrode includes a portion extending in a different direction than the first direction.

According to one or more exemplary embodiments, a display apparatus includes a display panel configured to display an image and a touch panel disposed on the display panel. The touch panel includes a substrate, detection electrodes, and connection electrodes. The substrate includes a planar surface portion and a curved surface portion adjacent to the planar surface portion in a first direction, the curved surface portion including an active region and another region disposed outside the active region. The detection electrodes are disposed on the substrate. The detection electrodes are arranged in the first direction and a second direction crossing the first direction. The connection electrodes electrically connect adjacent detection electrodes arranged in a same direction as one another. A connection electrode of the connection electrodes connecting detection electrodes adjacent to each other of the detection electrodes extending in the first direction is disposed in the active region of the curved surface portion. The connection electrode includes a portion extending in a different direction than the first direction.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
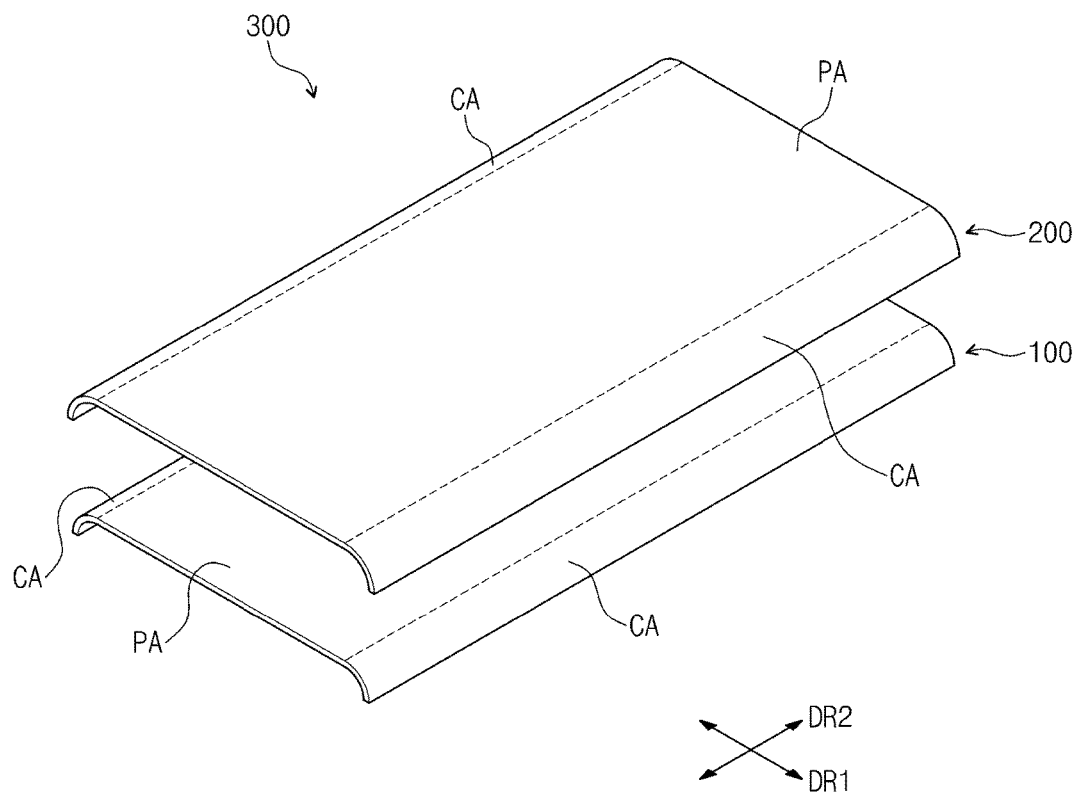
FIG. 1 schematically illustrates an exploded perspective view of a display apparatus, according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. Therefore, unless otherwise specified, the features, components, modules, layers, films, panels, regions, and/or aspects of the various illustrations may be otherwise combined, separated, interchanged, and/or rearranged without departing from the disclosed exemplary embodiments. Further, in the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. Further, the DR1-axis and the DR2-axis are not limited to axes of a rectangular coordinate system, and may be interpreted in a broader sense. For example, the DR1-axis and the DR2-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 schematically illustrates an exploded perspective view of a display apparatus, according to one or more exemplary embodiments.

Referring to FIG. 1, a display apparatus 300 may include a display panel 100 and a touch panel 200 disposed on the display panel 100. The display panel 100 and the touch panel 200 may have flexibility. For example, display elements are disposed on a flexible substrate, such that the display panel 100 may have flexibility. Also, touch elements are disposed on the flexible substrate, such that the touch panel 200 may have flexibility.

The display panel 100 may be an organic light emitting display panel including an organic light emitting element; however, exemplary embodiments are not limited thereto. For instance, various display panels, such as liquid crystal display panels, electrowetting display panels, electrophoretic display panels, etc., may be used. When the display panel 100 is a liquid crystal display panel, the display apparatus 300 may further include a lighting unit disposed under and/or at one or more edges of the display panel 100 and configured to provide light to the display panel 100.

The display panel 100 and the touch panel 200 may have a short side in a first direction DR1, and a long side in a second direction DR2 crossing the first direction DR1. The first direction DR1 may correspond to a row direction, and the second direction DR2 may correspond to a column direction. To this end, the touch panel 200 may be disposed on the display panel 100 with respect to a third direction crossing the first direction DR1 and the second direction DR3, such as perpendicular (or substantially perpendicular) to the first direction DR1 and the second direction DR2.

The display panel 100 and the touch panel 200 include a planar surface part (or portion) PA having a flat shape, and curved surface parts (or portions) CA disposed on both sides of the planar surface part PA in each of the display panel 100 and the touch panel 200 in the first direction DR1. The curved surface parts CA may have a curved surface shape with a determined radius of curvature with respect to the first direction DR1. The curved surface parts CA may integrally connect with the planar surface part PA. For instance, after the display panel 100 and/or the touch panel 200 are prepared in flat plate shapes, a determined force is applied to determined regions of one side and the other side of each of the display panel 100 and the touch panel 200 such that the curved surface parts CA are formed. After the curved surface parts CA are formed, the display panel 100 and the touch panel 200 are accommodated (or supported) in a case member with a shape corresponding to the curved surface parts CA such that the curved surface parts CA of the display panel 100 and the touch panel 200 may maintain the curved surface shape. Such a display apparatus 300 may be called an edge-type display apparatus.

According to one or more exemplary embodiments, when an input tool, such as a human hand, a touch pen, etc., contacts (or almost contacts) a screen, the touch panel 200 converts the contact position into an electrical signal. The signal converted into an electronic signal may be provided to the display panel 100 as an input signal. The display panel 100 provides a user with an image corresponding to the input signal in response to the input signal provided from the touch panel 200.

As a method of implementing the touch panel 200, a resistive overlay method, a capacitive overlay method, a surface acoustic wave method, an infrared method, or the like may be used. As an exemplary embodiment, the touch panel 200 may be a capacitive overlay-type touch panel 200. The capacitive overlay-type touch panel 200 includes a plurality of detection electrodes, which are described later. When a human hand, a touch pen, etc., contacts (or almost contacts) a screen, the touch panel 200 detects a change in the capacitance formed between the detection electrodes and converts the contact position into an electrical signal.

Figure 2:
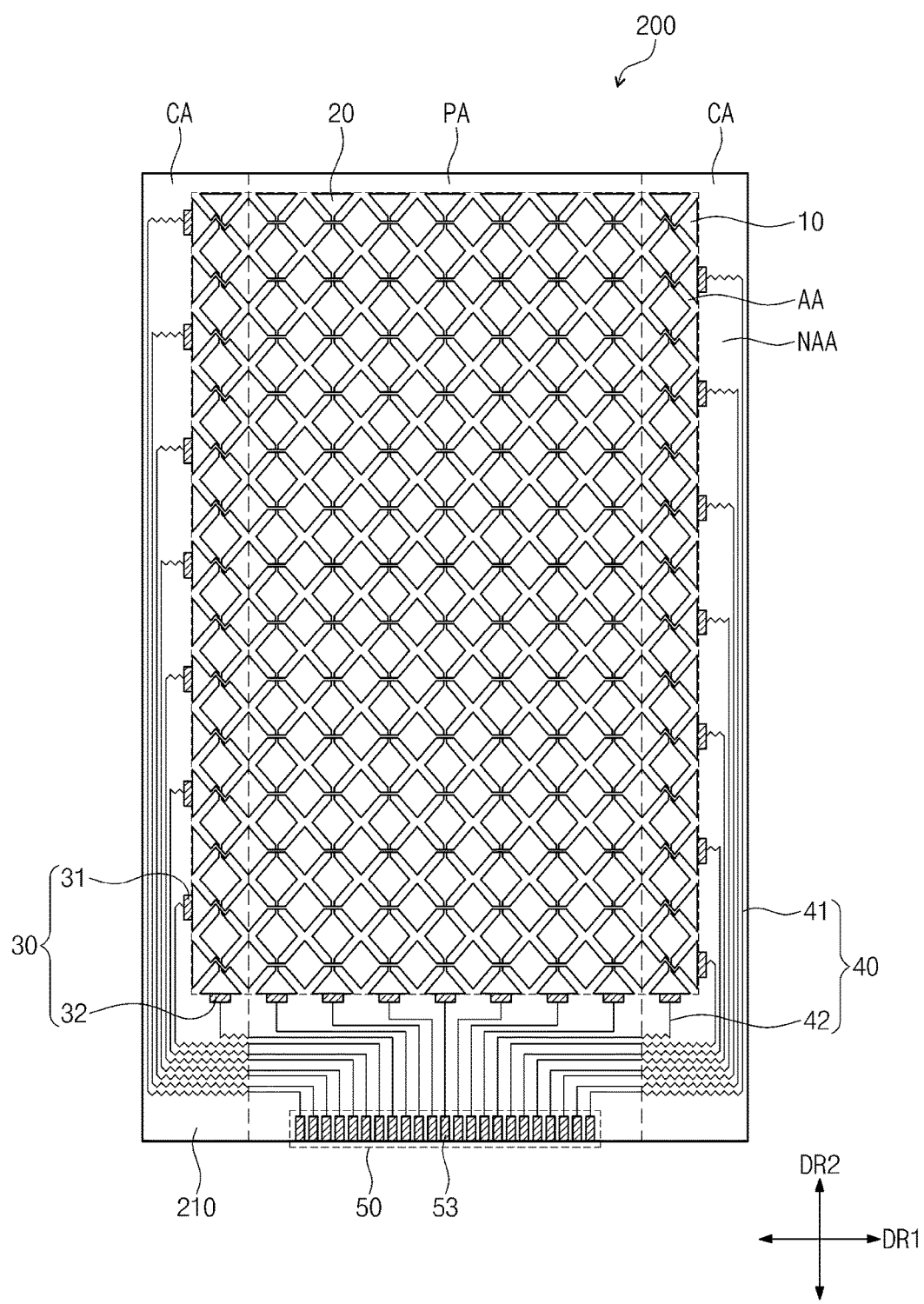
FIG. 2 is a plan view illustrating a touch panel of the display apparatus of FIG. 1, according to one or more exemplary embodiments.

FIG. 2 is a plan view illustrating a touch panel of the display apparatus of FIG. 1, according to one or more exemplary embodiments.

Referring to FIG. 2, the touch panel 200 includes a substrate 210, a plurality of detection electrodes 10 and 20, a plurality of pads 30, a plurality of signal lines 40, and a bonding (or connection) part 50. The detection electrodes 10 and 20, the pads 30, the signal lines 40, and the bonding part 50 are disposed on the substrate 210. The bonding part 50 may include a plurality of bonding pads (third pads) 53 electrically connected to the signal lines 40.

The substrate 210 may include a transparent film. As the transparent film, polyethylene terephthalate (PET), polyethylene (PE), polycarbonate (PC), cyclo olefin polymer (COP), cyclic olefin copolymer (COC), polymide (PI), polyvinyl chloride (PVC), polymethyl methacrylate (PMMA), polypropylene (PP), polystyrene (PS), and the like, may be used.

The substrate 210 of the touch panel 200 may include an active region AA and an inactive region NAA surrounding (or disposed outside) the active region AA. The detection electrodes 10 and 20 are disposed on the active region AA, and the pads 30, the signal lines 40 and the bonding part 50 are disposed on the inactive region NAA. Furthermore, the substrate 210 may include the planar surface part PA having a flat shape, and curved surface parts CA disposed on both sides of the planar surface part PA in the first direction DR1.

Referring to FIG. 2, in the first direction DR1, a determined region on the both sides of the outermost active region AA may be disposed on the region of the curved surface parts CA. The active region AA, which is not disposed on the curved surface parts CA, is disposed on the region of the planar surface part PA. In this manner, the detection electrodes 10 and 20, which are disposed on the outermost region on the left side of the active region AA and the outermost region on the right side of the active region AA, may be disposed on determined regions of the curved surface parts CA adjacent to the planar surface part PA.

According to one or more exemplary embodiments, the detection electrodes 10 and 20 may have a polygonal shape having the same shape and size as one another. For example, the detection electrodes 10 and 20 may have any one shape of a triangular shape or a diamond shape. The detection electrodes 10 and 20 having a diamond shape are shown, however, in order to dispose the detection electrodes 10 and 20 to be matched to a boundary portion of the active region AA, the triangle-shaped detection electrodes 10 and 20, which are portions (e.g., halves) of the diamond-shaped detection electrodes 10 and 20 may be used. In other words, the detection electrodes having triangular shapes of the detection electrodes 10 and 20 may be disposed on the boundary of the active region AA. The detection electrodes having diamond shapes of the detection electrodes 10 and 20 may be disposed on a portion of the active region AA at which the detection electrodes having triangular shapes are not disposed.

The detection electrodes 10 and 20 may include conductive materials configured to transmit the image light provided from the display panel 100. For example, the detection electrodes 10 and 20 may include a transparent conductive material, such as indium tin oxide (ITO), indium zinc oxide (IZO), poly(3,4-ethylenedioxythiophene) (PEDOT), or carbon nanotube (CNT). It is contemplated, however, that any other suitable material may be utilized in association with exemplary embodiments.

In one or more exemplary embodiments, the detection electrodes 10 and 20 are arranged in a plurality of rows and a plurality of columns on the active region AA of the substrate 210. For instance, first detection electrodes 10 arranged in rows are connected on a row-by-row basis by first connecting electrodes, and second detection electrodes 20 arranged in columns are connected on a column-by-column basis by second connecting electrodes. That is, the first electrodes 10 arranged in rows are connected in the first direction DR1 by the first connecting electrodes, and the second detection electrodes 20 arranged in columns are connected in the second direction DR2 by the second connecting electrodes.

The first and second detection electrodes 10 and 20 may be alternately disposed without overlapping each other. A capacitance is formed between the first and second detection electrodes 10 and 20. The first and second connecting electrodes, which connect the first and second detection electrodes 10 and 20 in any one direction, may have bent shapes. The detailed configurations of the first connecting electrodes that connect the first detection electrodes 10 and the second connecting electrodes that connect the second detection electrodes 20 will be described in detail below.

The pads 30, signal lines 40, and bonding part 50 may be defined as a wiring part that transmits a touch signal detected by the first and second detection electrodes 10 and 20. The wiring part is connected to ends of the first detection electrodes 10 arranged in rows and to ends of the second detection electrodes 20 arranged in columns. For instance, the pads 30 may include a plurality of first pads 31 electrically connected to the first detection electrodes 10 arranged in rows and a plurality of second pads 32 electrically connected to the second detection electrodes 20 arranged in columns. For example, referring to FIG. 2, the first pads 31 may be electrically connected to a first side of the first detection electrodes 10 arranged in odd numbered rows and to a second other side opposite to the one side of the first detection electrodes 10 arranged in even numbered rows. The second pads 32 may be electrically connected to a lower side of the second detection electrodes 20 arranged in columns.

Each of the signal lines 40 is electrically connected to the each of the pads 30. The signal lines 40 may include a relatively low resistance material, such as molybdenum (Mo), silver (Ag), titanium (Ti), copper (Cu), aluminum (Al), nickel (Ni), or molybdenum/aluminum/molybdenum (Mo/A/Mo). Also, the signal lines 40 may be formed by printing silver paste, which is a conductive material, on the substrate 210.

The signal lines 40 extend via the inactive region NAA adjacent to a first side (e.g. left side) of the active region AA, the inactive region NAA adjacent to a second side (e.g. right side) of the active region AA, and the inactive region NAA adjacent to a lower side of the active region AA. Each of the signal lines 40 may extend to be electrically connected to each of the third pads 53 of the bonding part 50. For instance, the signal lines 40 include a plurality of first signal lines 41 connected to the first pads 31 and a plurality of second signal lines 42 connected to the second pads 32. The first signal lines 41 may extend, from the first pads 31 to the third pads 53, while being bent in the first direction DR1, the second direction DR2, and the first direction DR1, and the second direction DR2. As shown in FIG. 2, the part of the first signal lines 41 extending in the first direction DR1 in the curved surface part CA may have zigzag patterns. The second signal line 42, which is disposed on the center of the substrate 210 in the first direction DR1 from among the second signal lines 42, extends in the second direction DR2. The second signal lines 42, except for the second signal line 42 that is disposed on the center of the substrate 210 in the first direction DR1 from among the second signal lines 42, extend, from the second pads 32 to the third pads 53, while being bent in the second direction DR2, and the first direction DR1, and the second direction DR2. As shown in FIG. 2, the part of the second signal lines 42 extending in the first direction DR1 in the curved surface part CA may have zigzag patterns.

The bonding part 50 may be disposed on a lower portion of the substrate 210 in the second direction DR2. The bonding part 50 may be connected to an external drive circuit (not shown), such as a detection circuit. When a human hand, a touch pen, or the like, contacts the screen of the display apparatus 300, capacitance formed between the first and second electrodes 10 and 20 may change. The change in the capacitance according to contact positions may be transmitted to the drive circuit via the pads 30, signal lines 40, and the bonding part 50. The change in the capacitance is converted into an electrical signal by, for example, an X- and Y-input processing circuit (not shown) of the drive circuit, such that the contact position may be determined.

Figure 3:
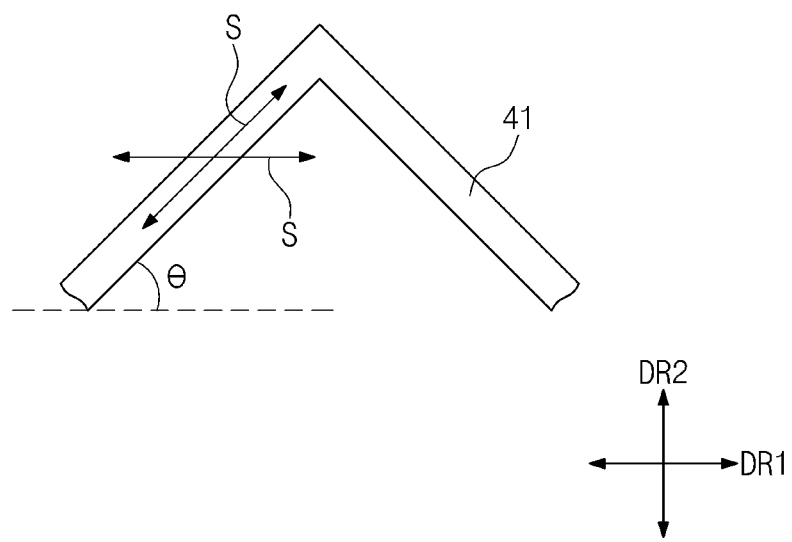
FIG. 3 is a partial, enlarged view of a first signal line having a zigzag pattern, according to one or more exemplary embodiments.
Figure 4:
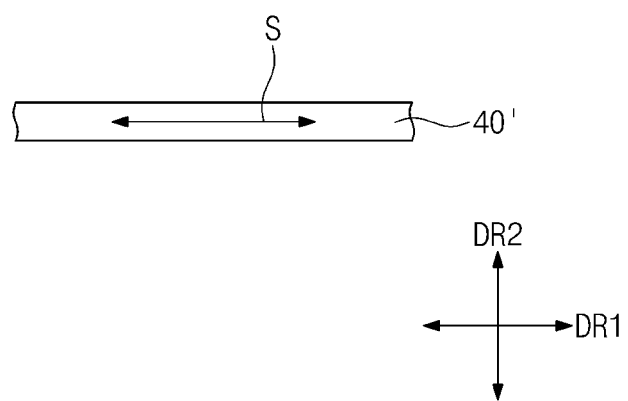
FIG. 4 illustrates a portion of a signal line having a straight line shape, according to one or more exemplary embodiments.

FIG. 3 is a partial, enlarged view of a first signal line having a zigzag pattern, according to one or more exemplary embodiments. FIG. 4 illustrates a portion of a signal line having a straight line shape, according to one or more exemplary embodiments.

Referring to FIG. 3, the first signal line 41 having a zigzag pattern may have a repetitive zigzag shape while being bent at a determined angle θ with respect to the first direction DR1. As shown in FIG. 2, from the first pads 31 to the third pads 53, the first signal lines 41 may extend while being bent in the first direction DR1, the second direction DR2, and the first direction DR1, and the second direction DR2, thereby the part of the first signal lines 41 extending in the first direction DR1 in the curved surface part CA may have zigzag patterns. The determined angle θ may be greater than 0 degrees and equal to or less than 45 degrees with respect to the first direction DR1.

When a determined force is applied to determined regions of one side and the other side of the touch panel 200 having a shape of flat plate such that the curved surface parts CA having a determined radius of curvature with respect to the first direction DR1, stress S (e.g. tensile stress) may be generated at the part of the first signal lines extending the first direction DR1 among the first signal lines 40 disposed on the curved surface parts CA in the first direction DR1. However, when the first signal line 41 extending in the first direction DR1 and having a zigzag pattern as shown in FIG. 3 is provided, the stress S may be distributed in the first direction DR1 and a direction that defines a determined angle θ with respect to the first direction DR1. That is, the stress S associated with forming the curved surface parts CA may be distributed in the first direction DR1 and along the first signal line 41 having a zigzag pattern.

As a comparative example, when a signal line 40' that is disposed on the curved surface parts CA and extends in the first direction DR1 having a straight line shape, as shown in FIG. 4, the stress S may be generated only in the first direction DR1. That is, since the stress S is not distributed (unlike the exemplary embodiment of FIG. 3), the signal line 40' may be damaged due to the stress S generated only in the first direction DR1. However, in one or more exemplary embodiments, the first signal lines 41 extending in the first direction DR1 in the curved surface part CA may have zigzag patterns. In this manner, the stress S associated with forming the curved surface parts CA is distributed and the first signal lines 41 may, thereby, be prevented (or at least reduced) from being damaged. Although the first signal lines 41 are exemplarily described in FIG. 3, the second signal lines 42 having zigzag patterns in the curved surface parts CA may also be prevented (or at least reduced) from being damaged and may be configured similarly to the first signal lines 41.

Figure 5A:
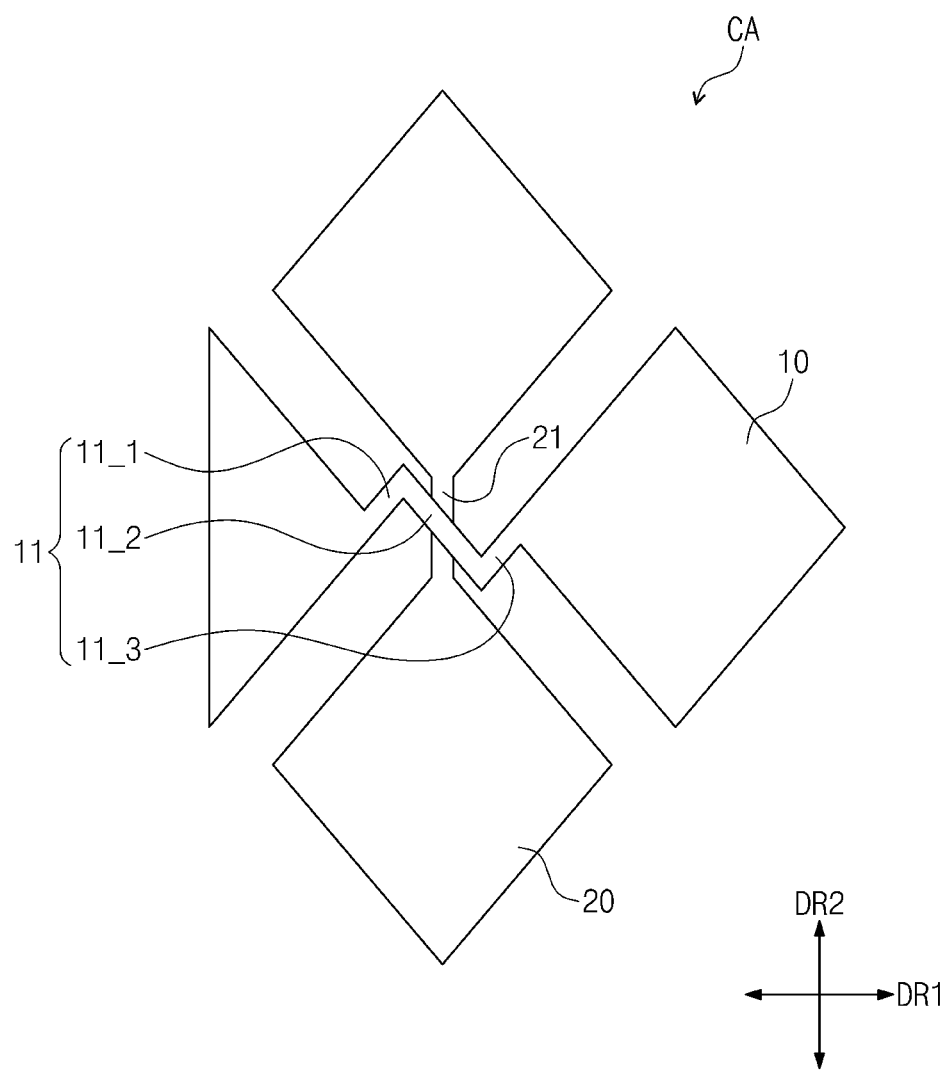
FIG. 5A illustrates a connection configuration of detection electrodes in a curved surface portion of the touch panel of FIG. 2, according to one or more exemplary embodiments.
Figure 5B:
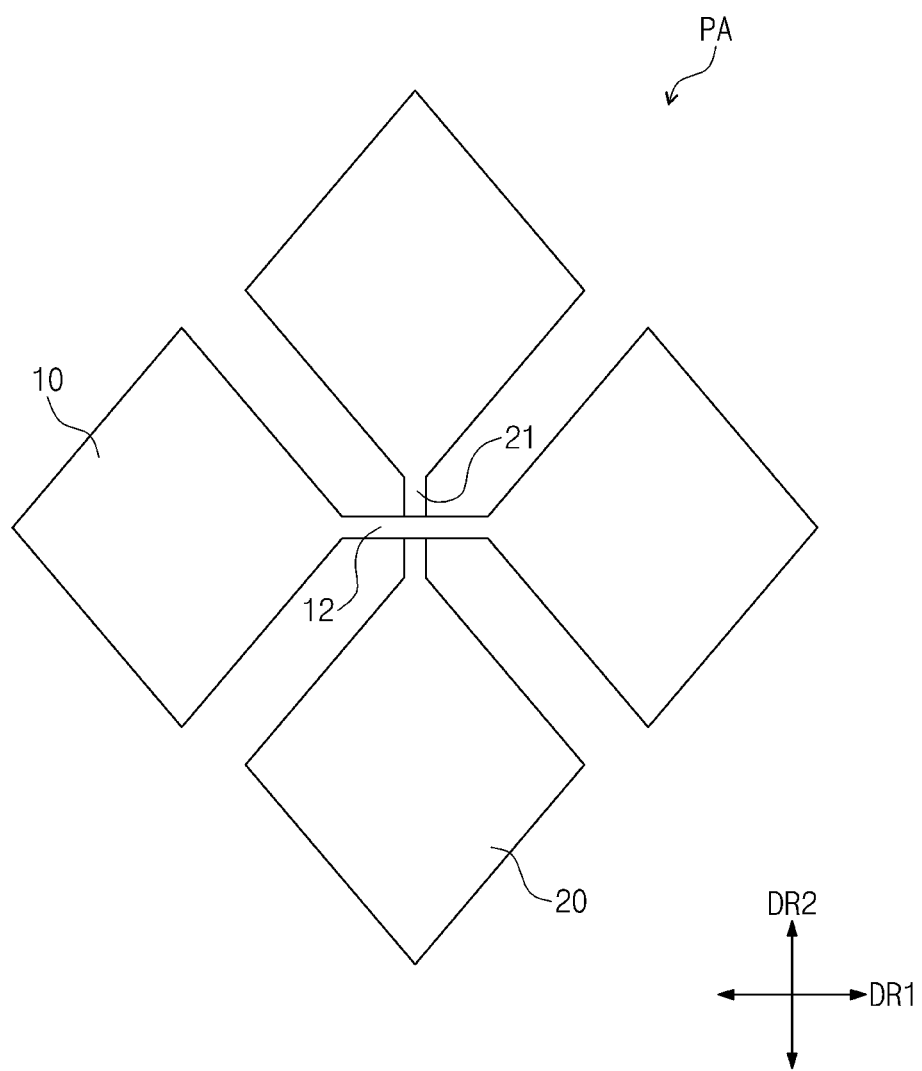
FIG. 5B illustrates a connection configuration of detection electrodes in a planar surface portion of the touch panel of FIG. 2, according to one or more exemplary embodiments.

FIG. 5A illustrates a connection configuration of detection electrodes in a curved surface portion of the touch panel of FIG. 2, according to one or more exemplary embodiments. FIG. 5B illustrates a connection configuration of detection electrodes in a planar surface portion of the touch panel of FIG. 2, according to one or more exemplary embodiments.

Referring to FIGS. 5A and 5B, the first connection electrodes 11 and 12 electrically connect the first detection electrodes 10 adjacent to each other. The second connection electrodes 21 electrically connect the second detection electrodes 20 adjacent to each other. The first and second detection electrodes 10 and 20 may be disposed on layers different from each other with an insulating film (not shown) disposed therebetween. For example, the second detection electrodes 20 may be disposed on the substrate 210, the insulating film may be disposed on the second detection electrodes 20, and the first detection electrodes 10 may be disposed on the insulating film. The first connection electrodes 11 and 12 and the second connection electrodes 21 are disposed with the insulating film disposed therebetween.

The first detection electrodes 10 and the first connection electrodes 11 and 12 may be simultaneously patterned on the same layer with the same material and, as such, may be integrally formed. The second detection electrodes 20 and the second connection electrodes 21 may be simultaneously patterned on the same layer with the same material and, as such, may be integrally formed; however, exemplary embodiments are not limited thereto. For instance, the first and second detection electrodes 10 and 20 may be disposed on the same layer. In this manner, the second detection electrodes 20 and the second connection electrodes 21 may be integrally formed, and the first connection electrodes 11 and 12 disposed on the insulating film may be connected to the first detection electrodes 10 adjacent to each other through contact holes formed to pass through the insulating film. To this end, the first detection electrodes 10 adjacent to each other may be electrically connected by the first connection electrodes 11 and 12. It is also contemplated that the first detection electrodes 10 and the first connection electrodes 11 and 12 may be integrally formed, and the second connection electrodes 21 disposed on the insulating film may be connected to the second detection electrodes 20 adjacent to each other through contact holes. To this end, the second detection electrodes 20 adjacent to each other may be electrically connected by the second connection electrodes 21.

Referring to FIG. 5A, the first connection electrode 11 that is disposed on the curved surface part CA and connects the first detection electrodes 10 in the first direction DR1 may extend to be inclined at a determined angle with respect to the first direction DR1. For instance, the first connection electrode 11 disposed on the curved surface part CA has a bent shape and electrically connect the first detection electrodes 10 adjacent to each other in the curved surface part CA. For instance, the first connection electrode 11 may have a doubly bent shape in which determined regions of both sides of the first connection electrode 11 are bent two times in directions opposite to each other.

As shown in FIG. 5A, the first connection electrode 11 includes a first extension part 11_1 connected to one side of a corresponding first detection electrode 10 of the first detection electrodes 10, a second extension part 11_2 connected to the first extension part 11_1, and a third extension part 11_3 connected to the second extension part 11_2. The first extension part 11_1 extends and is bent toward an upper right side from the first direction DR1 at a determined angle with respect to the first direction DR1. The second extension part 11_2 is connected to an end of the first extension part 11_1 and extends to be bent toward a lower right side from the first direction DR1 at a determined angle with respect to the first direction DR1. The third extension part 11_3 is connected to an end of the second extension part 11_2 and extends to be bent toward an upper right side at a determined angle with respect to the first direction DR1.

The third extension part 11_3 is connected to the first detection electrode 10 that is adjacent to the first detection electrode 10 connected to the first extension part 11_1. As illustrated in FIG. 5A, the first and third extension parts 11_1 and 11_3 may extend parallel to one another, but exemplary embodiments are not limited thereto. For instance, the first and third extension parts 11_1 and 11_3 may not extend parallel to one another. The second connection electrode 21 disposed on the curved surface part CA has a straight line shape and electrically connects the second detection electrodes 20 adjacent to each other in the curved surface part CA.

Referring to FIG. 5B, the first connection electrode 12 disposed on the planar surface part PA has a straight line shape and electrically connects the first detection electrodes 10 adjacent to each other in the planar surface part PA. The second connection electrode 21 disposed on the planar surface part PA has a straight line shape and electrically connects the second detection electrodes 20 adjacent to each other in the planar surface part PA.

According to one or more exemplary embodiments, when a determined force is applied to the touch panel 200 having a flat plate shape such that the curved surface parts CA having a determined radius of curvature with respect to the first direction DR1 are formed, the stress S (e.g. tensile stress) may be generated at the part of the signal lines 40 extending in the first direction DR1 among the signal lines 40 disposed on the curved surface parts CA in the first direction DR1. When the first connection electrode 11 has a straight line shape extending in the first direction DR1 in the curved surface parts, the first connection electrode 11 may be damaged as described with reference to FIG. 4 since the stress S is not distributed. However, the first connection electrode 11 has a doubly bent shape similar to the zigzag patterns of the first signal lines 41, so that the stress S may be distributed in the first connection electrode 11. In this manner, the stress S associated with forming the curved surface parts CA is distributed and the signal lines 40 and the first connection electrode 11 may be prevented from being damaged.

Although the first connection electrode 11 having a doubly bent shape is exemplarily described in FIG. 5A, exemplary embodiments are not limited thereto. When the curved surface parts CA having a determined radius of curvature with respect to the second direction DR2 are formed on determined regions on both sides of the touch panel 200 with respect to the second direction DR2, the first connection electrode 11 may have a straight line shape, and the second connection electrodes 21 may have the same shape as the first connection electrodes 11 shown in FIG. 5A. In this manner, the touch panel 200 and the display apparatus 300 including the touch panel 200 may prevent defects associated with stress, which may be generated in the curved surface parts CA and may be distributed by the signal lines 40 having zigzag patterns and the first connection electrode 11 having a bent shape.

Figure 6:
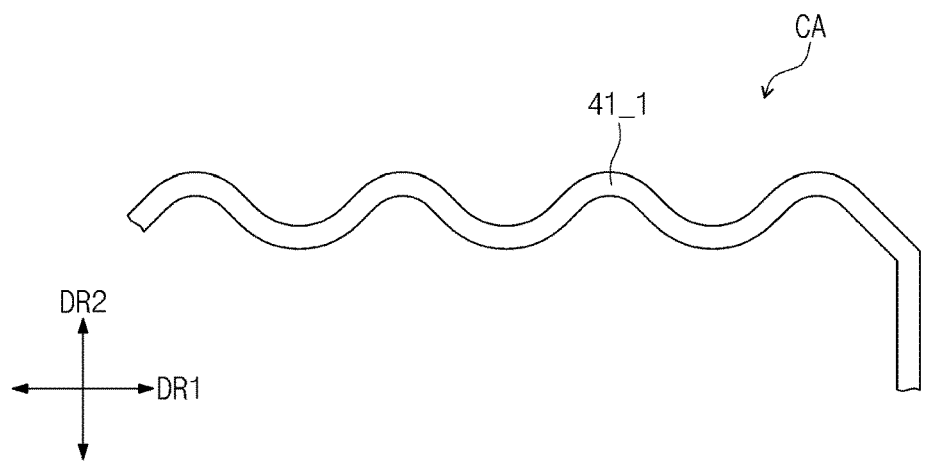
FIG. 6 illustrates a portion of signal lines of a display apparatus, according to one or more exemplary embodiments.
Figure 7:
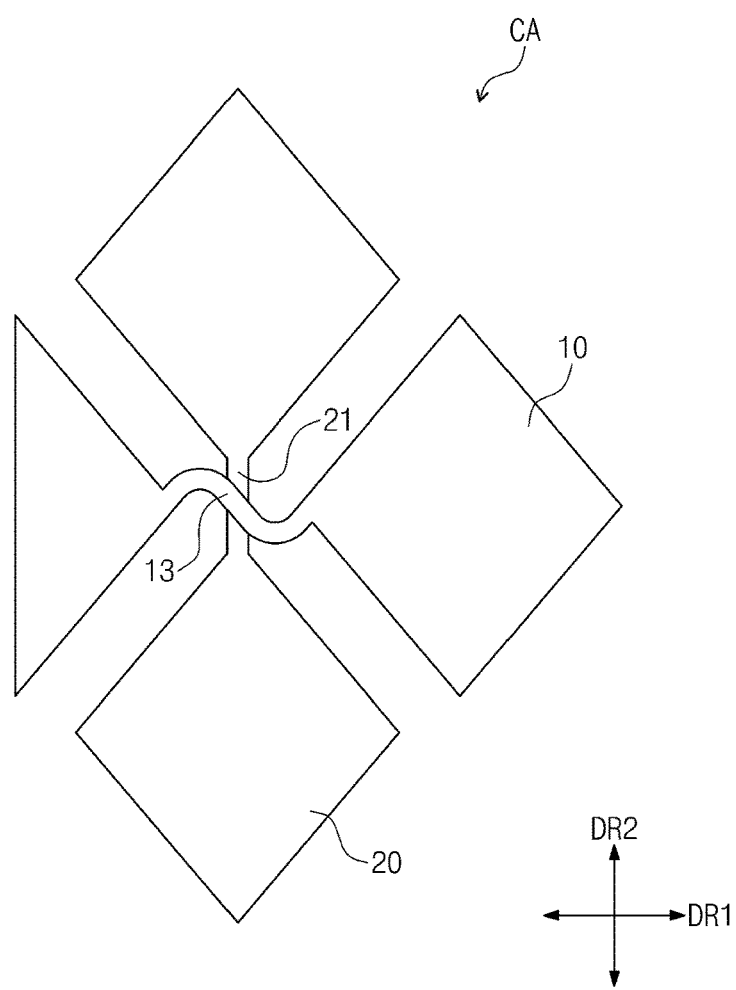
FIG. 7 illustrates a connection configuration of detection electrodes in a curved surface portion of a display apparatus, according to one or more exemplary embodiments.

FIG. 6 illustrates a portion of signal lines of a display apparatus, according to one or more exemplary embodiments. FIG. 7 illustrates a connection configuration of detection electrodes in a curved surface portion of a display apparatus, according to one or more exemplary embodiments.

Referring to FIG. 6, a first signal line 41_1 extending in the first direction DR1 on a curved surface part CA has a wavy pattern. Although not shown, the second signal lines extending in the first direction DR1 on the curved surface part CA may have a zigzag pattern. In the same manner, a first connection electrode 13 on the curved surface part CA has a wavy pattern shape and electrically connects first detection electrodes 10 adjacent to each other as shown in FIG. 7. Except for the configuration of the first signal line 41_1, the second signal lines, and the first connection electrode 13, the display apparatus and touch panel of FIGS. 6 and 7 is similarly configured as the display apparatus 300 and touch panel 200 of FIGS. 3 and 5A. It is noted that the wavy pattern shape may also distribute stress similar to the bent shape. As such, the display apparatus according to one or more embodiments may prevent defects that may occur in the curved surface parts CA.

Figure 8:
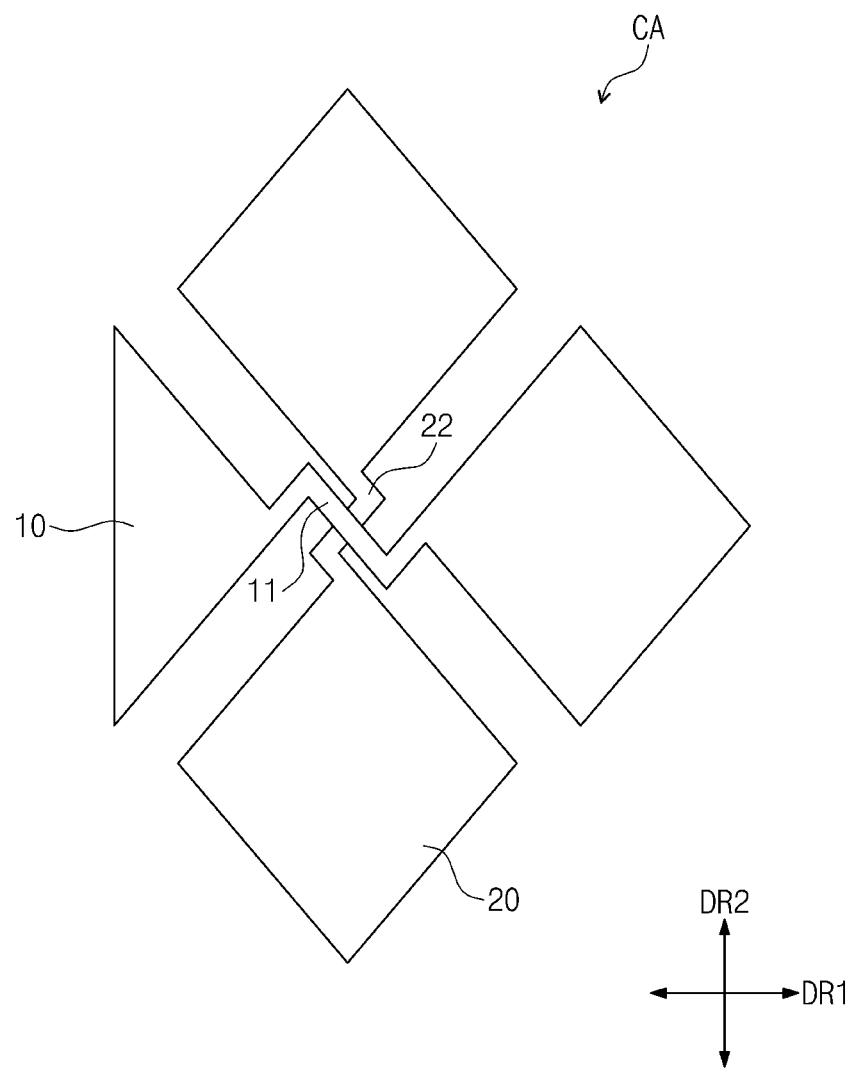
FIG. 8 illustrates a connection configuration of detection electrodes in a curved surface portion of a display apparatus, according to one or more exemplary embodiments.
Figure 9:
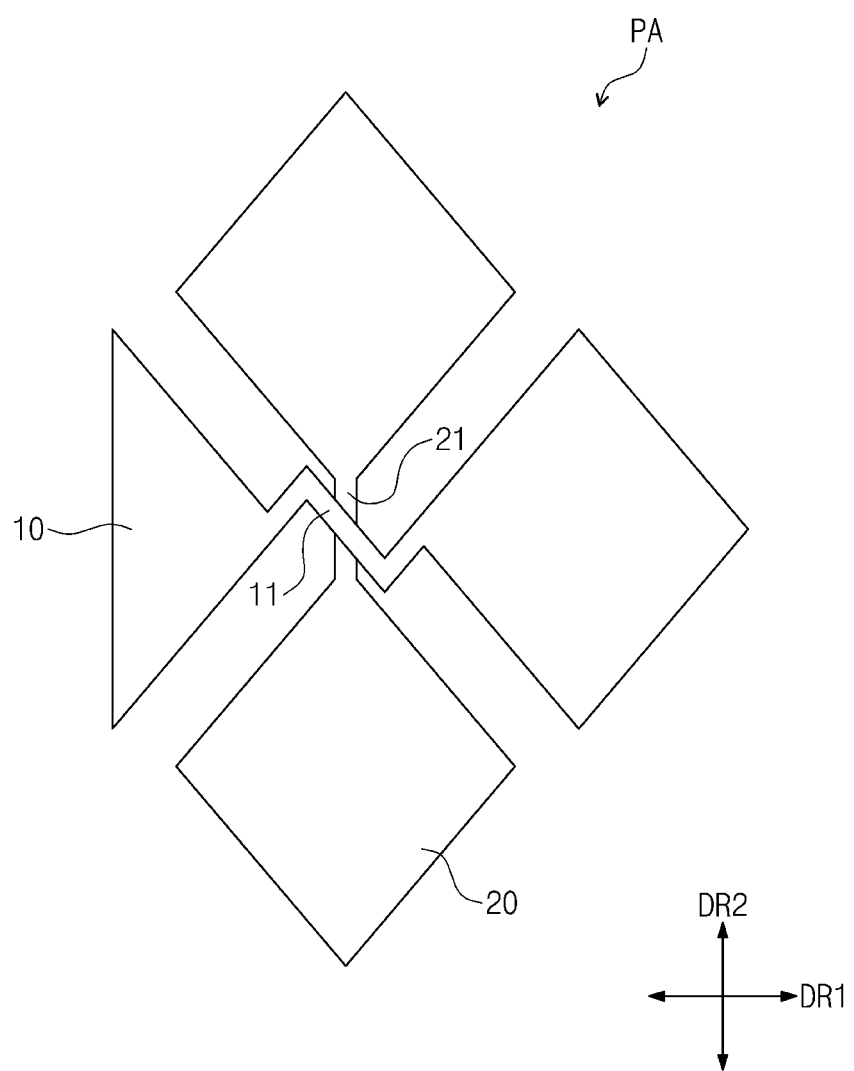
FIG. 9 illustrates a connection configuration of detection electrodes in a planar surface portion of a display apparatus, according to one or more exemplary embodiments.
Figure 10:
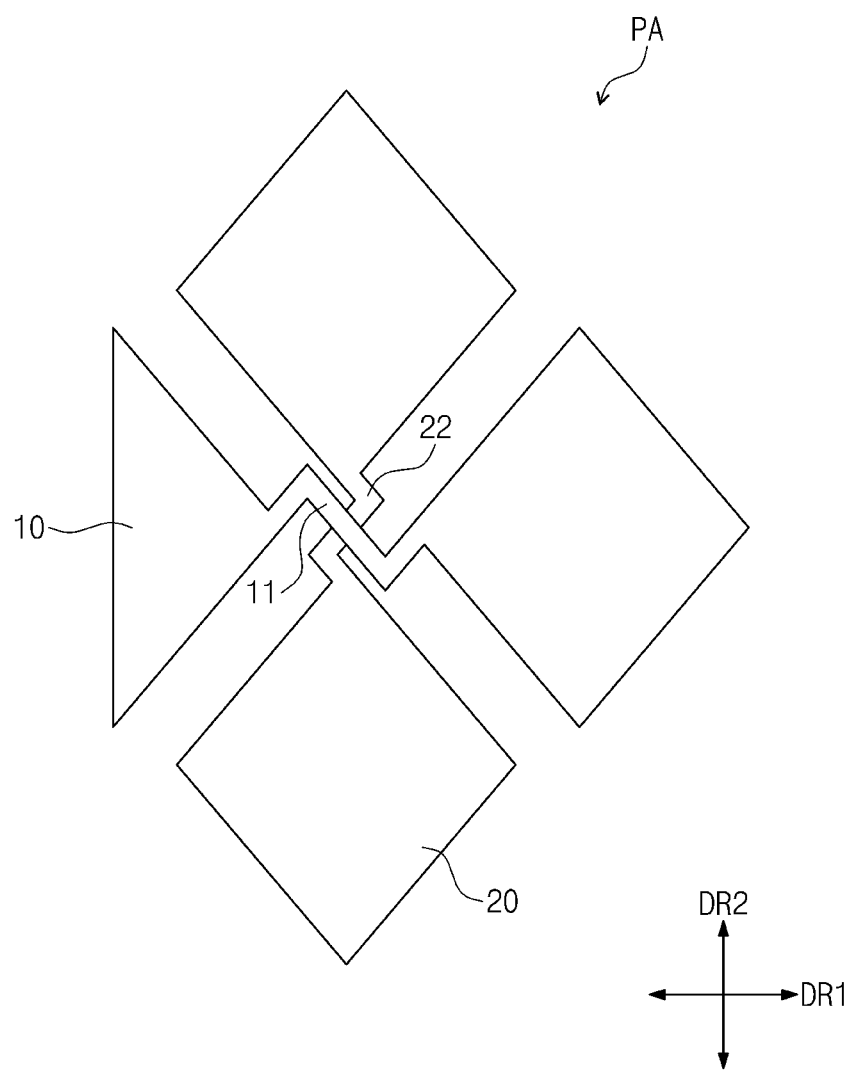
FIG. 10 illustrates a connection configuration of detection electrodes in a planar surface portion of a display apparatus, according to one or more exemplary embodiments.

FIG. 8 illustrates a connection configuration of detection electrodes in a curved surface portion of a display apparatus, according to one or more exemplary embodiments. FIG. 9 illustrates a connection configuration of detection electrodes in a planar surface portion of a display apparatus, according to one or more exemplary embodiments. FIG. 10 illustrates a connection configuration of detection electrodes in a planar surface portion of a display apparatus, according to one or more exemplary embodiments.

Referring to FIG. 8, a first connection electrode 11 disposed on a curved surface part CA may have a bent shape like the first connection electrode 11 described with reference to FIG. 5A. The first connection electrode 11 electrically connects first detection electrodes 10 adjacent to each other. A second connection electrode 22 that is disposed on a curved surface part CA and electrically connects second detection electrodes 20 in a second direction DR2 may have a bent shape similar to the first connection electrode 11. Except for the aforementioned configurational difference, the display apparatus and touch panel of FIG. 8 have the same configuration as the display apparatus 300 and touch panel 200 of FIG. 5A.

Referring to FIG. 9, a first connection electrode 11 disposed on a planar surface part PA may have a bent shape like the first connection electrode 11 described with reference to FIG. 5A. The first connection electrode 11 electrically connects first detection electrodes 10 adjacent to each other. Referring to FIG. 10, first and second connection electrodes 11 and 22 disposed on a planar surface part PA may have bent shapes like the first and second connection electrodes 11 and 22 described with reference to FIG. 8. Except for the aforementioned configurational difference, the display apparatuses and touch panels of FIGS. 9 and 10 have the same configuration as the display apparatus 300 and touch panel 200 of FIG. 5B.

Figure 11:
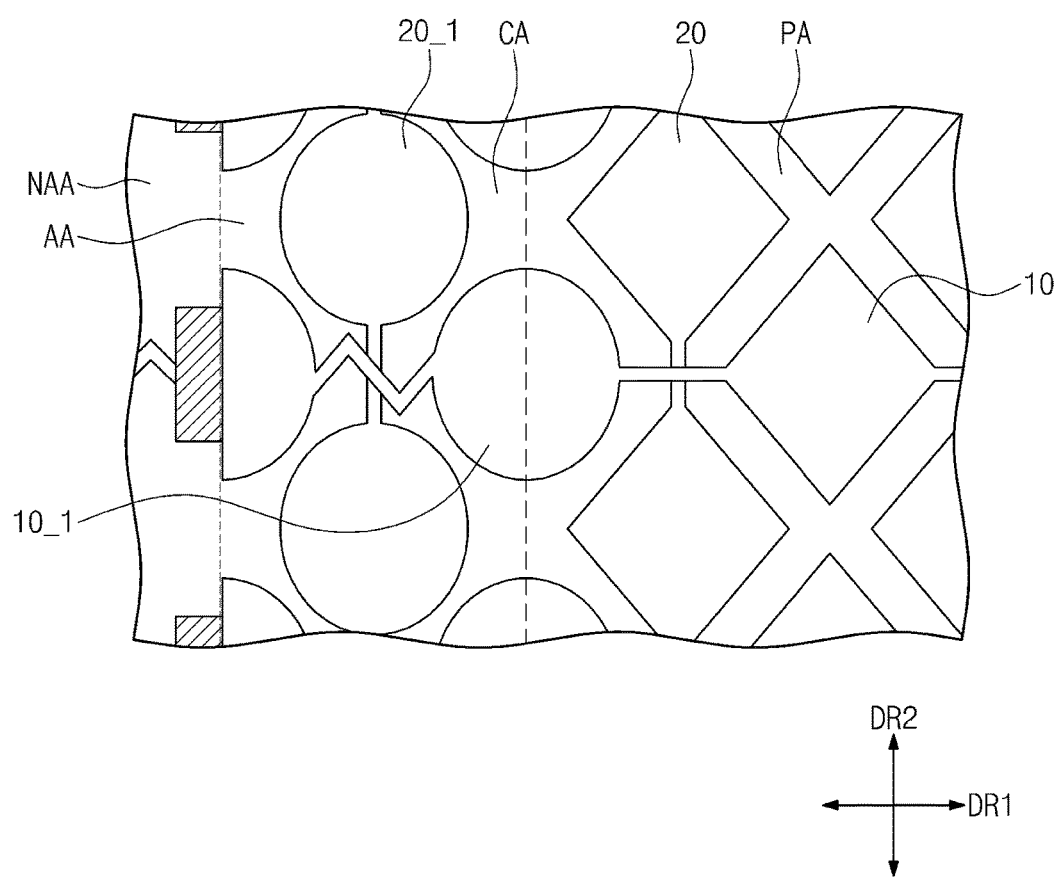
FIG. 11 illustrates partial regions of a curved surface portion and a planar portion in a display apparatus, according to one or more exemplary embodiments.
Figure 12:
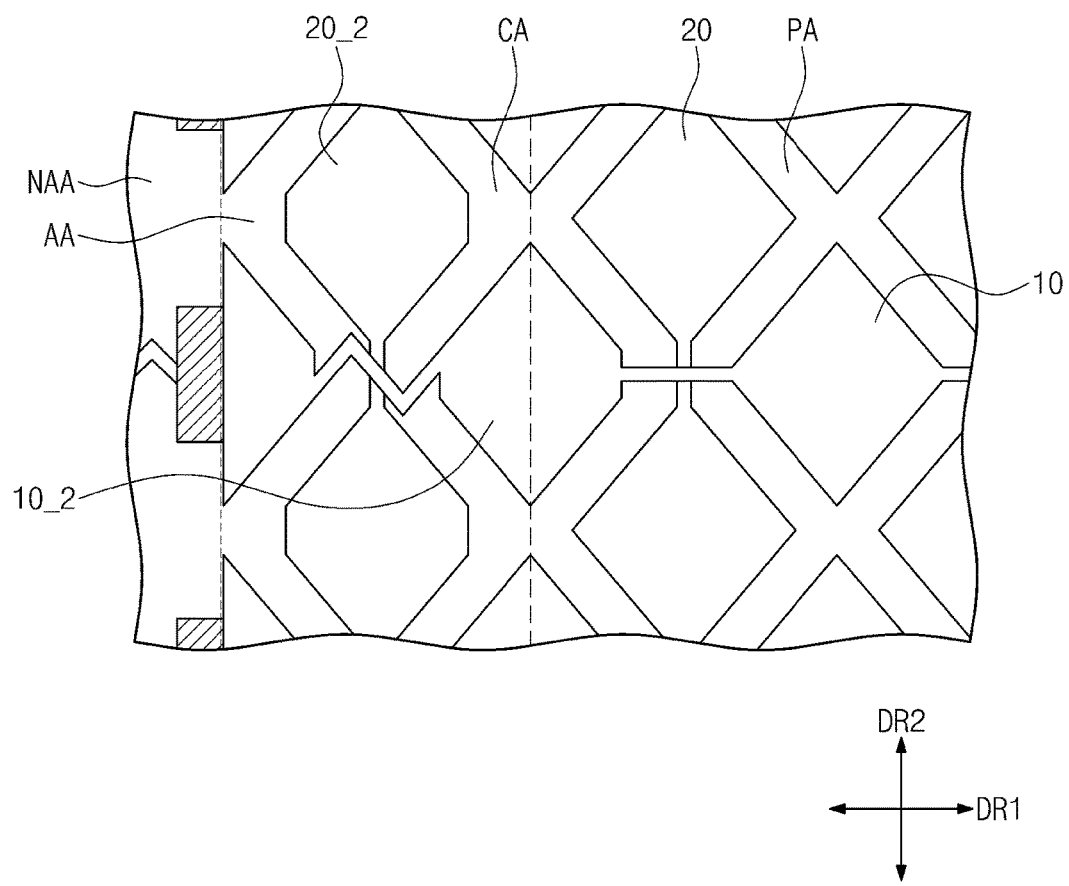
FIG. 12 illustrates partial regions of a curved surface portion and a planar surface portion in a display apparatus, according to one or more exemplary embodiments.

FIG. 11 illustrates partial regions of a curved surface portion and a planar portion in a display apparatus, according to one or more exemplary embodiments. FIG. 12 illustrates partial regions of a curved surface portion and a planar surface portion in a display apparatus, according to one or more exemplary embodiments.

Referring to FIG. 11, first detection electrodes 10 and 10_1 include a plurality of first sub detection electrodes 10 having diamond shapes and a plurality of second sub detection electrodes 10_1 having circular or semi-circular shapes. Second detection electrodes 20 and 20_1 include a plurality of third sub detection electrodes 20 having diamond shapes and a plurality of fourth sub detection electrodes 20_1 having circular or semi-circular shapes.

The first and third sub detection electrodes 10 and 20 having diamond shapes are disposed on an active region AA overlapping a planar surface part PA. The second and fourth sub detection electrodes 10_1 and 20_1 having semi-circular shapes may be disposed on the boundary of the active region AA overlapping a curved surface part CA. The second and fourth sub detection electrodes 10_1 and 20_1 having circular shapes are disposed on the active region AA overlapping the curved surface part CA and the boundary between the curved surface part CA and the planar surface part PA in the active region AA.

Except for the above-mentioned configurational differences, the display apparatus and touch panel of FIG. 11 has the same configuration as the display apparatus 300 and touch panel of FIGS. 5A and 5B.

Referring to FIG. 12, first detection electrodes 10 and 10_2 include a plurality of first sub detection electrodes 10 having diamond shapes and a plurality of second sub detection electrodes 10_2 having hexagonal or trapezoidal shapes. Second detection electrodes 20 and 20_2 include a plurality of third sub detection electrodes 20 having diamond shapes and a plurality of fourth sub detection electrodes 20_2 having hexagonal or trapezoidal shapes.

The first and third sub detection electrodes 10 and 20 having diamond shapes are disposed on an active region AA overlapping a planar surface part PA. The second and fourth sub detection electrodes 10_2 and 20_2 having trapezoidal shapes may be disposed on the boundary of the active region AA overlapping a curved surface part CA. The second and fourth sub detection electrodes 10_2 and 20_2 having hexagonal shapes are disposed on the active region AA overlapping the curved surface part CA. and the boundary between the curved surface part CA and the planar surface part PA in the active region AA.

Except for the above-mentioned configurational differences, the display apparatus and touch panel of FIG. 12 has the same configuration as the display apparatus 300 and touch panel 200 of FIGS. 5A and 5B.

According to one or more exemplary embodiments, a diamond shape is substantially a rectangle and has four sides. As the number of sides increases, the more the stress may be distributed. Accordingly, the stress may be distributed more in the hexagonal touch electrodes 10_2 and 20_2 than in the diamond shaped electrodes. Also, the circular shape may distribute more stress than the polygonal shape. Accordingly, the stress may be distributed more in the circular touch electrodes 10_1 and 20_1.

Although the detection electrodes 10_1, 20_1, 10_2 and 20_2 having the circular, hexagonal, semi-circular, and trapezoidal shapes are exemplarily described with reference to FIGS. 11 and 12, the shape of the detection electrodes are not limited thereto, and may be variously set. For example, detection electrodes having a polygonal shape with a number of sides greater than four, and detection electrodes that are halves of the detection electrodes may be disposed on the touch panel.

According to one or more exemplary embodiments, the display apparatuses and touch panels may prevent defects, which may occur in curved surface parts CA, by the signal lines having zigzag patterns and the first connection electrode having bent shapes. It is noted, however, that a touch panel and a display apparatus may include signal lines having bent shapes or wavy pattern shapes and similar connection electrodes, so that defects in curved surface parts may be prevented.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:
1. A touch panel comprising:
a substrate comprising:
 a planar surface portion; and
 a curved surface portion adjacent to the planar surface portion in a first direction, the curved surface portion comprising an active region and another region disposed outside the active region;
detection electrodes disposed on the substrate, the detection electrodes comprising:
first detection electrodes arranged in the first direction and electrically connected to one another; and
second detection electrodes arranged in a second direction crossing the first direction and electrically connected to one another; and
connection electrodes electrically connecting adjacent detection electrodes arranged in a same direction as one another, the connection electrodes comprising:
first connection electrodes electrically connecting adjacent first detection electrodes of the first detection electrodes; and
second connection electrodes electrically connecting adjacent second detection electrodes of the second detection electrodes,
wherein:
a connection electrode of the first connection electrodes is disposed in the active region of the curved surface portion, the connection electrode comprising a portion extending in a different direction than the first direction and second direction; and
another connection electrode of the first connection electrodes is disposed in the active region of the planar surface portion, the another connection electrode extending in a straight line shape in the first direction.

2. The touch panel of claim 1, wherein:
the planar surface portion is flat; and
the curved surface portion is curved at determined radius of curvature with respect to the first direction.

3. The touch panel of claim 1, wherein:
some of the first connection electrodes are disposed on the curved surface portion, the some of the first connection electrodes comprising the first connection electrode; and
the some of the first connection electrodes are inclined at a determined angle with respect to the first direction, the determined angle being greater than 0° and less than 90°.

4. The touch panel of claim 3, wherein:
the detection electrodes comprise:
additional first detection electrodes arranged in the first direction; and
additional second detection electrodes arranged in the second direction;
the first detection electrodes, the additional first detection electrodes, the second detection electrodes, and the additional second detection electrodes are arranged in an alternating pattern, the first detection electrodes and the additional first detection electrodes being spaced apart from the second detection electrodes and the additional second detection electrodes; and
the first connection electrodes and the second connection electrodes cross one another with an insulating film disposed therebetween.

5. The touch panel of claim 3, wherein the some of the first connection electrodes comprise bent shapes.

6. The touch panel of claim 5, wherein:
some of the first connection electrodes are disposed on the planar surface portion, the some of the first connection electrodes disposed on the planar surface portion comprising the another connection electrode;

the some of the first connection electrodes disposed on the planar surface portion extend in straight line shapes in the first direction; and
the second connection electrodes extend in straight line shapes in the second direction.

7. The touch panel of claim 5, wherein the some of the first connection electrodes comprise doubly bent shapes, the doubly bent shapes comprising portions bent in opposite directions of one another.

8. The touch panel of claim 7, wherein:
in a plan view, each of the some of the first connection electrodes comprises:
a first extension portion connected to a first side of a first detection electrode of the first detection electrodes, the first extension portion extending in the first direction and toward an upper right side of the touch panel;
a second extension portion connected to an end of the first extension portion, the second extension portion extending in the first direction and toward a lower right side of the touch panel; and
a third extension portion connected to an end of the second extension portion, the third extension portion extending in the first direction toward the upper right side of the touch panel; and
the third extension portion is connected to a first detection electrode of the first detection electrodes that is adjacent to the first detection electrode connected to the first extension portion.

9. The touch panel of claim 3, wherein:
some of the second connection electrodes are disposed on the curved surface portion; and
the some of the first connection electrodes and the some of the second connection electrodes comprise bent shapes.

10. The touch panel of claim 3, wherein:
other first connection electrodes of the first connection electrodes are disposed on the planar surface portion; and
the some of the first connection electrodes and the other first connection electrodes comprise bent shapes.

11. The touch panel of claim 3, wherein:
other first connection electrodes of the first connection electrodes are disposed on the planar surface portion;
some of the second connection electrodes are disposed on the planar surface portion; and
the some of the first connection electrodes, the other first connection electrodes, and the some of the second connection electrodes comprise bent shapes.

12. The touch panel of claim 3, wherein the some of the first connection electrodes comprise wavy pattern shapes.

13. The touch panel of claim 3, further comprising:
a wiring part disposed in the another region, the wiring part being connected to some of the first detection electrodes and some of the second detection electrodes.

14. The touch panel of claim 13, wherein:
the wiring part comprises:
first pads electrically connected to the some of the first detection electrodes connected to the wiring part, the some of the first detection electrodes connected to the wiring part being disposed in outermost portions of the active region;
second pads electrically connected to the some of the second detection electrodes connected to the wiring part, the some of the second detection electrodes connected to the wiring part being disposed in outermost portions of the active region;

first signal lines connected to the first pads;

second signal lines connected to the second pads; and a connection part disposed on the substrate in the another region, the connection part being connected to the first signal lines and the second signal lines;

the first signal lines extend along opposing sides of the active region; and the second signal lines extend in a portion of the another region disposed between the opposing sides of the active region.

15. The touch panel of claim 14, wherein the first signal lines and the second signal lines comprise at least one of molybdenum, silver, titanium, copper, aluminum, nickel, and silver paste.

16. The touch panel of claim 14, wherein:

some of first signal lines comprise first portions extending in the first direction;

some of the second signal lines comprise second portions extending in the first direction;

the first portions and the second portions comprise zigzag patterns.

17. The touch panel of claim 16, wherein the first portions and the second portions extend while repeatedly bent in a zigzag pattern at angles of greater than 0 degrees and less than or equal to 45 degrees with respect to the first direction.

18. The touch panel of claim 1, wherein the detection electrodes are diamond shaped.

19. The touch panel of claim 1, wherein:

third detection electrodes of the detection electrodes are disposed on the planar surface portion, the third detection electrodes being diamond-shaped; and fourth detection electrodes of the detection electrodes are disposed on the curved surface portion and overlap a boundary between the curved surface portion and the planar surface portion, the fourth detection electrodes being circular-shaped or polygon-shaped with greater than four sides.

20. A display apparatus comprising:

a display panel configured to display an image; and a touch panel disposed on the display panel, the touch panel comprising:

a substrate comprising a planar surface portion and a curved surface portion adjacent to the planar surface portion in a first direction, the curved surface portion including an active region and another region disposed outside the active region;

detection electrodes disposed on the substrate, the detection electrodes comprising:

first detection electrodes arranged in the first direction and electrically connected to one another; and second detection electrodes arranged in a second direction crossing the first direction and electrically connected to one another; and connection electrodes electrically connecting adjacent detection electrodes arranged in a same direction as one another, the connection electrodes comprising:

first connection electrodes electrically connecting adjacent first detection electrodes of the first detection electrodes; and second connection electrodes electrically connecting adjacent second detection electrodes of the second detection electrodes, wherein:

a connection electrode of the first connection electrodes is disposed in the active region of the curved surface portion, the connection electrode comprising a portion extending in a different direction than the first direction and the second direction; and another connection electrode of the first connection electrodes is disposed in the active region of the planar surface portion, the another connection electrode extending in a straight line shape in the first direction.

\* \* \* \* \*